United States Patent
Merriman

(10) Patent No.: US 10,669,866 B2
(45) Date of Patent: Jun. 2, 2020

(54) COMPOSITE AEROFOIL STRUCTURE WITH A CUTTING EDGE TIP PORTION

(71) Applicant: ROLLS-ROYCE PLC, London (GB)

(72) Inventor: Nicholas Michael Merriman, Derby (GB)

(73) Assignee: ROLLS-ROYCE PLC, London (GB)

( * ) Notice: Subject to any disclaimer, the term of this patent is extended or adjusted under 35 U.S.C. 154(b) by 175 days.

(21) Appl. No.: 14/654,390

(22) PCT Filed: Dec. 19, 2013

(86) PCT No.: PCT/GB2013/053369
§ 371 (c)(1),
(2) Date: Jun. 19, 2015

(87) PCT Pub. No.: WO2014/096838
PCT Pub. Date: Jun. 26, 2014

(65) Prior Publication Data
US 2015/0337670 A1    Nov. 26, 2015

(30) Foreign Application Priority Data

Dec. 19, 2012   (GB) .................................. 1222973.8

(51) Int. Cl.
*F01D 5/28*    (2006.01)
*F01D 5/14*    (2006.01)
*F01D 5/20*    (2006.01)

(52) U.S. Cl.
CPC ............. *F01D 5/288* (2013.01); *F01D 5/147* (2013.01); *F01D 5/20* (2013.01); *F01D 5/282* (2013.01);
(Continued)

(58) Field of Classification Search
CPC ........ F01D 11/08; F01D 11/12; F01D 11/125; F01D 11/127; F01D 5/20; F01D 5/147; F01D 5/282; F01D 5/288
See application file for complete search history.

(56) References Cited

U.S. PATENT DOCUMENTS

| 899,319 A | 9/1908 | Parsons et al. |
| 5,603,603 A * | 2/1997 | Benoit ................... F01D 11/12 |
| | | 277/415 |

(Continued)

FOREIGN PATENT DOCUMENTS

| DE | 19824583 A1 | 12/1999 |
| EP | 0291407 A1 | 11/1988 |
| EP | 1770244 A1 | 4/2007 |
| EP | 2141327 A2 | 1/2010 |

(Continued)

OTHER PUBLICATIONS

Apr. 17, 2014—(WO) International Search Report and Written Opinion—Application No. PCT/GB2013/053369—10 pages.

(Continued)

*Primary Examiner* — Justin D Seabe
*Assistant Examiner* — Cameron A Corday
(74) *Attorney, Agent, or Firm* — Banner & Witcoff, Ltd.

(57) ABSTRACT

An aerofoil structure (26) for a gas turbine engine (10), the aerofoil structure comprising a carbon composite aerofoil portion (38) and a tip portion (48), wherein the tip portion comprises a tip surface (60) configured to face a corresponding casing structure (30), the tip portion further comprising a ridge line (62) extending along at least a portion of the tip surface, wherein the tip surface comprises a first surface (64) and a second surface (66) provided either side of the ridge line, the ridge line being defined by the intersection of the first and second surfaces, wherein the ridge line is configured to cut into the casing structure during an interaction between the aerofoil structure and casing structure.

17 Claims, 7 Drawing Sheets

(52) U.S. Cl.
CPC ...... *F05D 2220/32* (2013.01); *F05D 2230/90* (2013.01); *F05D 2240/30* (2013.01); *F05D 2300/2282* (2013.01); *F05D 2300/2285* (2013.01); *Y02T 50/672* (2013.01); *Y02T 50/6765* (2018.05)

(56) References Cited

U.S. PATENT DOCUMENTS

| | | | |
|---|---|---|---|
| 6,086,328 A * | 7/2000 | Lee | F01D 5/18 415/115 |
| 6,413,051 B1 | 7/2002 | Chou et al. | |
| 6,431,837 B1 * | 8/2002 | Velicki | F01D 5/282 416/223 R |
| 2008/0284109 A1 * | 11/2008 | Northfield | F01D 11/125 277/412 |
| 2010/0158675 A1 * | 6/2010 | Blanchard | F01D 5/225 415/173.4 |
| 2010/0296939 A1 * | 11/2010 | Jevons | F01D 5/20 416/224 |
| 2012/0269638 A1 * | 10/2012 | Dyer | F01D 5/20 416/223 R |
| 2014/0064964 A1 * | 3/2014 | Care | F01D 5/20 416/2 |

FOREIGN PATENT DOCUMENTS

| | | | |
|---|---|---|---|
| EP | 2253803 | A2 | 11/2010 |
| EP | 2273072 | A2 | 1/2011 |
| EP | 2309097 | A1 | 4/2011 |
| EP | 2514922 | A2 | 10/2012 |

OTHER PUBLICATIONS

Nov. 29, 2013—(GB) Search Report—Applicaton No. GB1222973. 8—5 pages.

Sep. 28, 2017—(EP)—Examination Report—App. No. 13 812 035.7—5 pages.

\* cited by examiner

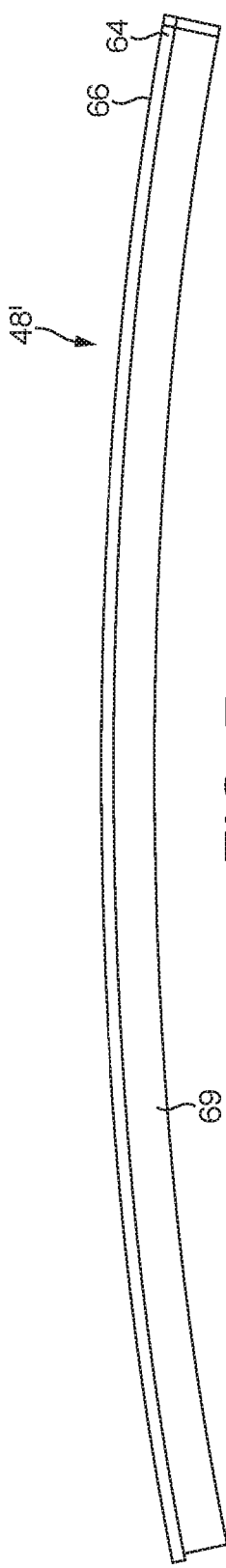
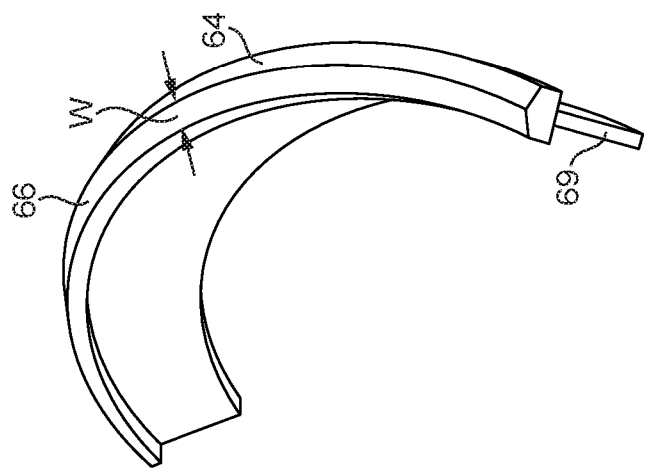
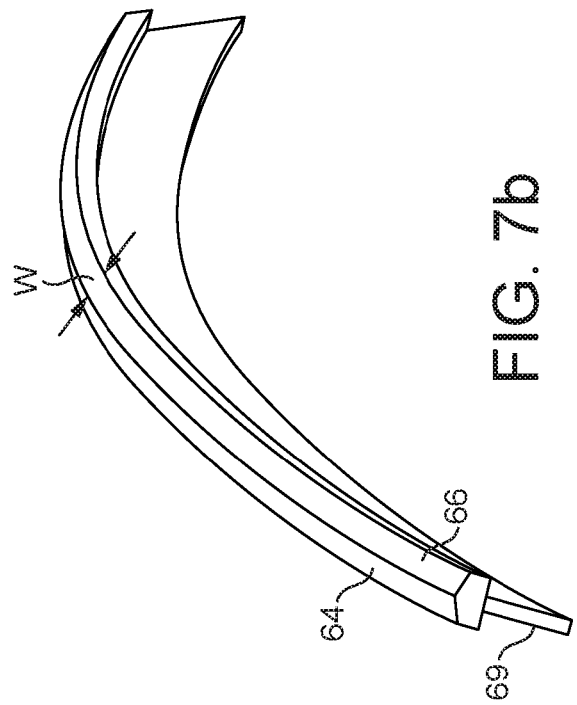

COMPOSITE AEROFOIL STRUCTURE WITH A CUTTING EDGE TIP PORTION

CROSS REFERENCE TO RELATED APPLICATIONS

This application is a National Stage Application under 35 U.S.C. § 371 of co-pending PCT application number PCT/GB2013/053369, filed 19 Dec. 2013; which claims priority to GB1222973.8, filed 19 Dec. 2012, both of which are hereby incorporated by reference in their entireties.

The present disclosure relates to blades for gas turbine engines and the like and relates particularly but not exclusively to improvements relating to the tips of such blades and to modifications thereto for enabling said blades to abrade the liners of casings associated therewith.

BACKGROUND

The blades of gas turbine engines are arranged with a minimum clearance between the tips of the blades and the casings associated therewith, as any gap therebetween will contribute to a reduction in efficiency. Therefore, to minimise the clearance between the blade and the casing, titanium fan blades currently used may cut into a casing liner using the plain square edge of the tip. During the cutting or rubbing of the liner, the blade tip typically reaches temperatures of 500° C. and, for a titanium blade, such temperatures do not damage the tip. Further, the inherent strength of a titanium tip, where the blade is solid, allows the tip to survive a heavy rub or significant incursion into the liner, for example following a bird strike in a jet engine.

However, in the case of a composite fan blade, tolerating the high temperatures and surviving a heavy rub represent a significant engineering challenge. For example, the maximum allowable temperature for a carbon composite material is approximately 120° C. Accordingly, previously-proposed composite fan blades do not allow the tips of the blades to rub at all, and in doing so accept instead a reduction in the efficiency and an increase in engine fuel burn. There is therefore a need for a fan blade that can permit the tip of a composite fan blade to cut or rub into the liner and thereby maintain the fan efficiencies equivalent to existing all titanium fans.

The present disclosure seeks to provide a novel blade, which at least reduces the above problem whilst providing an effective cutting surface to the blade tip.

Statements of Invention

According to a first aspect of the present invention there is provided an aerofoil structure for a gas turbine engine, the aerofoil structure comprising a carbon composite aerofoil portion and a tip portion, wherein the tip portion comprises a tip surface configured to face a corresponding casing structure, the tip portion further comprising a ridge line extending along at least a portion of the tip surface, wherein the tip surface comprises a first surface and a second surface provided either side of the ridge line, the ridge line being defined by the intersection of the first and second surfaces, wherein the ridge line is configured to cut into the casing structure during an interaction between the aerofoil structure and casing structure.

The ridge line may extend substantially along or in the direction of the aerofoil structure camber line at the tip surface. The camber line is the mean line of the aerofoil structure profile which extends from the leading edge to the trailing edge, halfway between the pressure and suction surfaces of the aerofoil structure. The camber line may extend approximately in a chordwise direction. The ridge line may be substantially parallel to the camber line of the aerofoil structure at the tip surface.

The first surface, second surface and ridge line may substantially define a roof-top shaped cross-section, e.g. in a radial plane. (The radial plane may be that defined by the radial axis, e.g. the radial plane may be perpendicular to the axial direction.) The first surface may be angled at a first angle with respect to a radial axis of the aerofoil structure. The second surface may be angled at a second angle with respect to the radial axis of the aerofoil structure. The first and second angles may be substantially the same. The first and second angles may be different.

One or both of the first and second surfaces may be convex. One or both of the first and second surfaces may be concave. One of the first and second surfaces may be convex and the other may be concave.

One or both of the first and second surfaces may comprise one or more cutting edges provided on the surface thereon.

An angle between one of the first and second surfaces and a tangent to a radial axis of the aerofoil structure may be greater than or equal to a maximum anticipated lean angle of the aerofoil structure relative to the radial axis, e.g. which may occur outside a normal mode of operation for the aerofoil structure.

The tip portion may further comprise a further ridge line extending along at least a portion of the tip surface. The further ridge line may be defined by the intersection of third and fourth surfaces provided on the tip surface. Features of the first and second surfaces may apply equally to the third and fourth surfaces. A trough may be provided between two of the aforementioned surfaces. The further ridge line may be substantially parallel to the ridge line.

The aerofoil structure may further comprise a coating provided over the ridge line. The coating may extend over the tip surface. The coating may extend over and beyond the tip surface, e.g. the coating may extend onto the pressure and/or suction surfaces of the aerofoil structure. The coating may comprise a material having a higher hardness than the tip portion. The coating may comprise a thin-film coating having a thickness of between 2 and 10 microns. The coating may comprise Titanium Nitride and/or Chromium Nitride. The coating may comprise embedded abrasive particles, such as Cubic Boron Nitride (CBN), Zirconia (e.g. Zirconium Dioxide) or any other similarly hard particles.

The aerofoil structure may comprise a metallic, e.g. titanium, tip portion.

In one arrangement the aerofoil structure may comprise a compressor blade, e.g. a compressor fan blade, of a gas turbine engine. In an alternative arrangement the aerofoil structure may comprise a turbine blade of a gas turbine engine. The present disclosure may also provide a gas turbine engine having an aerofoil structure as described above.

It will be appreciated that the ridge line cutting edge at the tip of the aerofoil structure serves to protect a composite material of the aerofoil structure and/or any adhesive from undue heating. The ridge line cutting edge may also serve to minimise the radial and tangential forces experienced by the tip and thus the rest of the aerofoil structure, following for example a bird strike.

BRIEF DESCRIPTION OF THE DRAWINGS

Exemplary embodiments of the present disclosure will be more fully described by way of example only with reference to the accompanying drawings in which:

FIGS. 7a, 7b and 7c are perspective views of a blade tip portion according to further examples of the present disclosure.

DETAILED DESCRIPTION

Figure 1:
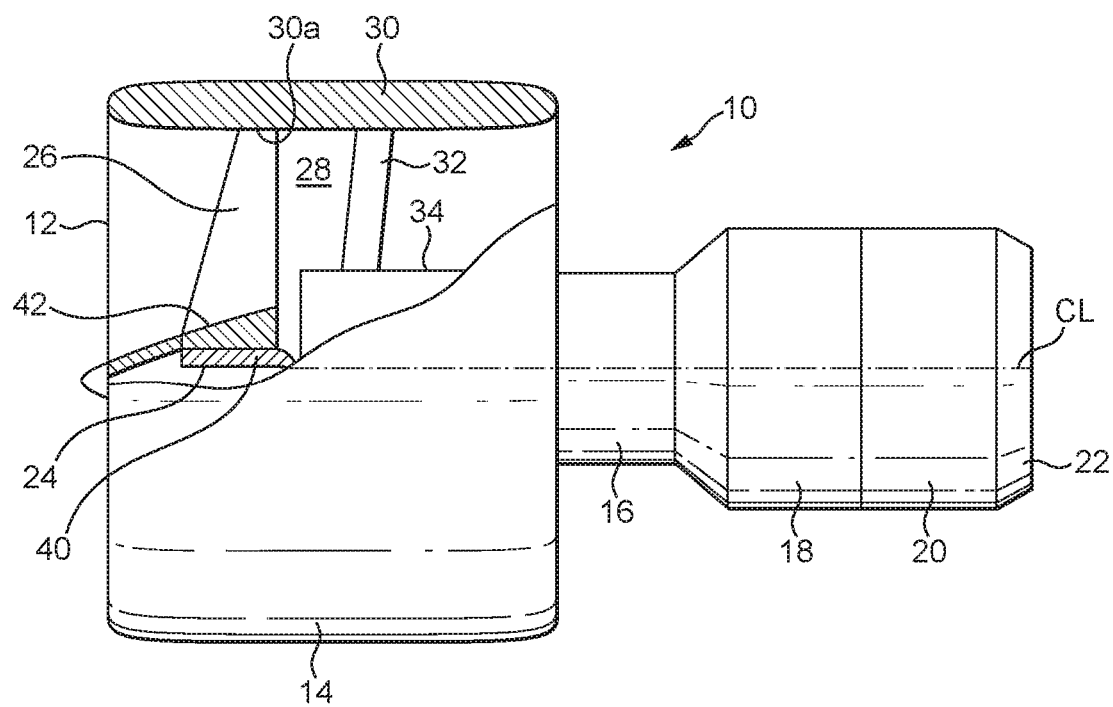
FIG. 1 is a diagrammatic representation of a gas turbine engine incorporating the present invention.

Referring briefly to FIG. 1, a turbofan gas turbine engine 10, comprises in flow series an inlet 12, a fan section 14, a compressor section 16, a combustion section 18, a turbine section 20 and an exhaust 22. The fan section 14 comprises a fan rotor 24 carrying a plurality of circumferentially spaced radially outwardly extending fan blades 26. The fan blades 26 are arranged in a bypass duct 28 defined by a fan casing 30 having an abradable lining 30a, which surrounds the fan rotor 24 and fan blades 26. The fan casing 30 is secured to a core engine casing 34 by a plurality of circumferentially spaced radially extending fan outlet guide vanes 32. The fan rotor 24 and fan blades 26 are arranged to be driven by a turbine (not shown) in the turbine section 20 via a shaft (not shown). The compressor section 16 comprises one or more compressors (not shown) arranged to be driven by one or more turbines (not shown) in the turbine section 20 via respective shafts (not shown). The engine includes a longitudinally extending centre line CL around which the blades rotate in a direction R.

Figure 2:
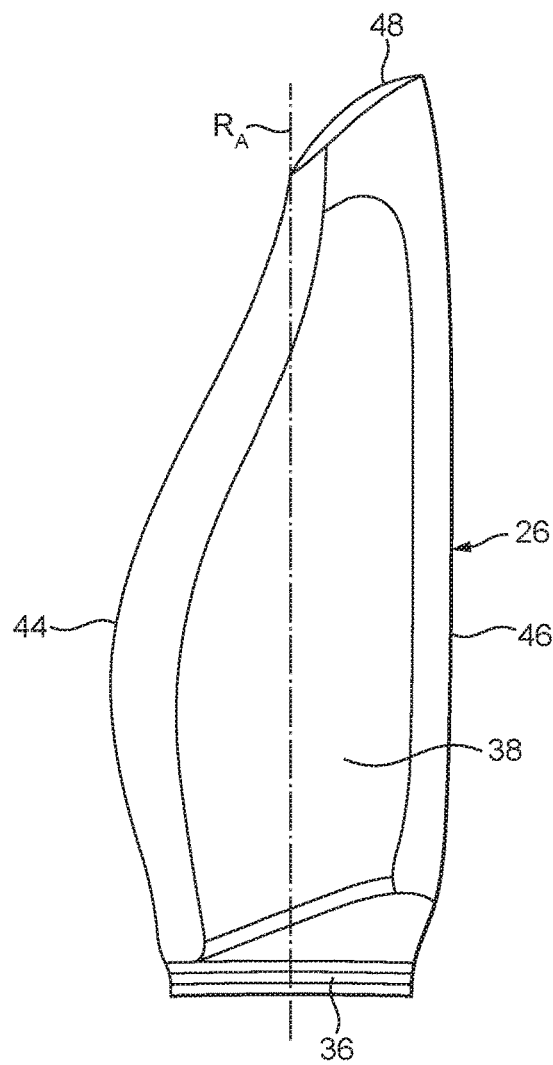
FIG. 2 is a view of an exemplar blade for a gas turbine engine incorporating a tip portion of the present disclosure at a tip thereof.

An exemplary fan blade 26, to which the present invention may be applied, is shown more clearly in FIG. 2. The fan blade 26 comprises a root portion 36 at a radially inner end and an aerofoil portion 38. The root portion 36 is arranged to locate in a slot 40 in the rim of the disc 42 of the fan rotor 24, and for example the root portion 36 may be dovetail shape, fir-tree shape, or other conventional shape, in cross-section and hence the corresponding slot 40 in the rim of the disc 42 of the fan rotor 24 is a similar shape. The aerofoil portion 38 has a leading edge 44, a trailing edge 46 and a tip 48 at a radially outer end remote from the root portion 36 and the fan rotor 24. A concave pressure surface 50 extends from the leading edge 44 to the trailing edge 46 and a convex suction surface 52 also extends from the leading edge 44 to the trailing edge 46.

Figure 3:
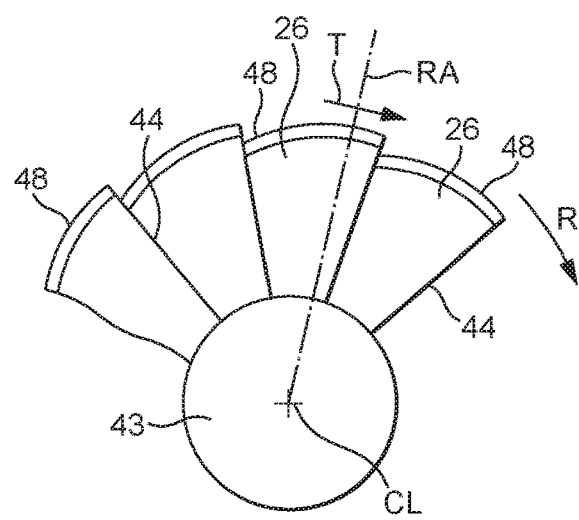
FIG. 3 is a simplified view of the front elevation of part of a typical compressor fan blade assembly from a gas turbine engine of FIG. 1 and illustrates the direction of rotation about central axis CL and the radial axis of the blades RA.

FIG. 3 illustrates a plurality of blades 26 assembled in the rotor disc 42 and also illustrates the relationship between the centre line of the engine CL, a Radial Axis RA of the blades 26 and the tip 48. The radial axis RA is shown from the centre line CL in a direction radially outwards towards the casing. Arrow T illustrates the direction of a tangent referred to later herein. In particular, FIG. 3 illustrates the position of the blade tip 48 of a blade 26 within part of a blade set. As the blade set rotates in direction R the leading edge 44 of the blade is incident with the incoming air flow. A nose cone 43 covers the shaft and provides an air-washed surface from the engine centreline CL into the root of the blade.

In normal use the blades 26 are not subjected to excessive loads and do not materially deflect. In the event that the blades are subjected to an adverse impact, such as may be experienced during a bird strike or blade off event, the blade may be caused to deflect or (un)twist into an abnormal position. In the abnormal position portions of the tip 48 may come into contact with the casing 30 or any abradable lining 30a provided on the inner surface thereof. The tip may also come into contact with the casing in other situations, such as during engine run in, aircraft take off or other aircraft manoeuvres. Whilst a certain degree of contact can normally be accommodated by abrading the abradable lining 30a, excessive contact may cause the tip of a normal blade or the casing itself to be damaged.

Figure 4:
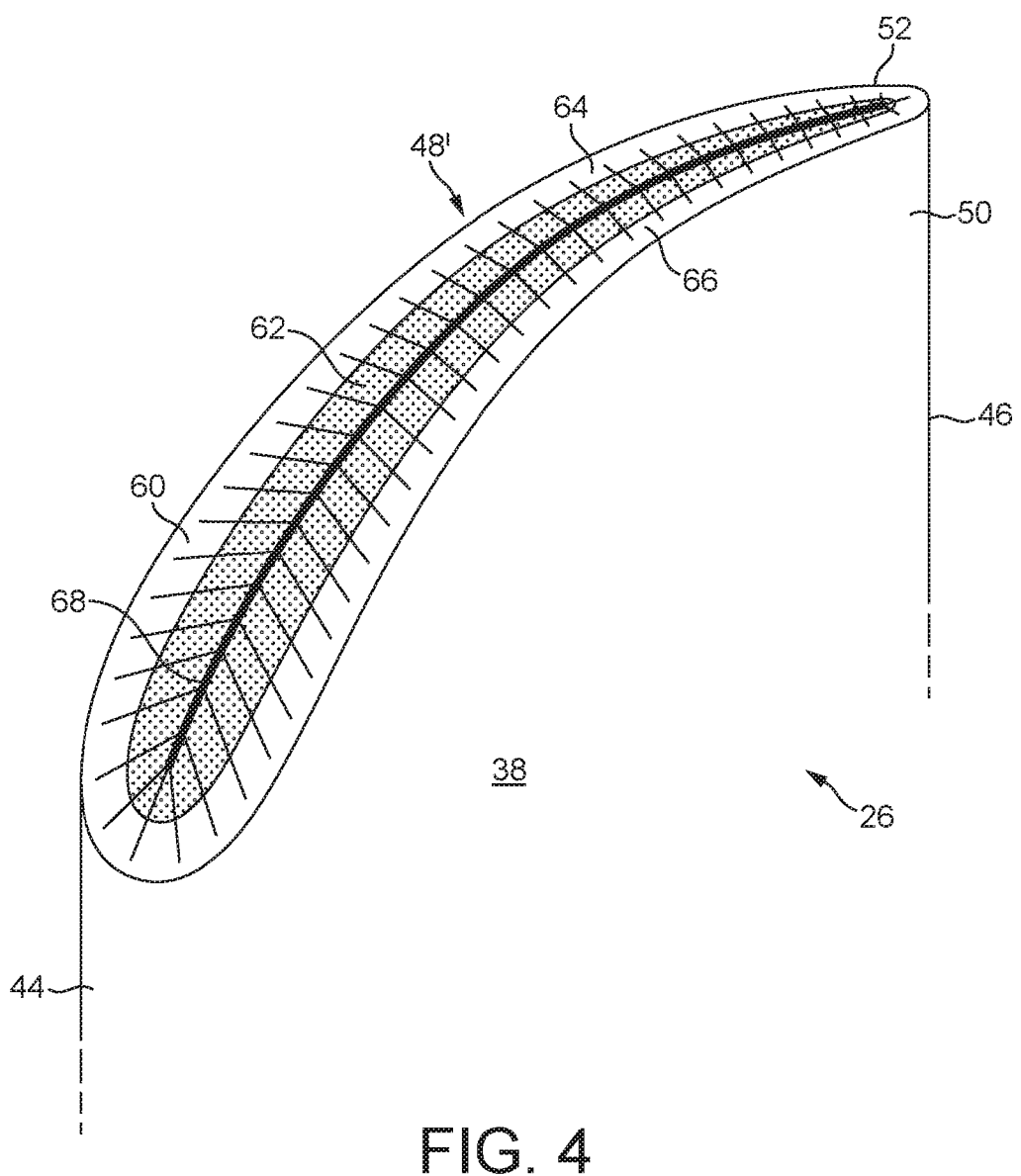
FIG. 4 is a perspective view of a blade tip according to an example of the present disclosure.

To this end, referring to FIG. 4, the present disclosure relates to an aerofoil structure, e.g. blade 26, such as a compressor fan blade, comprising an aerofoil portion 38 and a tip portion 48', wherein the tip portion comprises a tip surface 60 and a ridge line 62 extending along at least a portion of the tip surface. As depicted, the tip surface 60 comprises a first surface 64 and a second surface 66 provided either side of the ridge line, the ridge line 62 being defined by the intersection of the first and second surfaces. As such, the ridge line 62 protrudes above the remainder of the tip portion 48'. Furthermore, the ridge line 62 is spaced apart from the edges between the tip surface 60 and the pressure and suction surfaces 50, 52. It will be appreciated that the ridge line 62 is configured to cut into the casing structure 30 during an interaction between the blade 26 and casing structure.

The ridge line 62 extends substantially in the direction of the blade camber line at the tip surface. As is known in the art, the camber line is the mean line of the blade profile which extends from the leading edge 44 to the trading edge 46, halfway between the pressure and suction surfaces 50, 52 of the blade. As depicted, the ridge line 62 may be substantially coincident with the camber line. However, the ridge line 62 may not start and/or finish at the leading and trailing edges 44, 46 and the ridge line may only extend over a portion of the tip surface.

The blade 26 may further comprise a coating 68, such as an abrasive coating, provided over the ridge line 62. The coating may extend over substantially the entire tip surface 60, or as depicted just over a region surrounding the ridge line 62. The coating 68 may also extend over and beyond the tip surface 60, e.g. the coating may extend onto a portion of the pressure and/or suction surfaces 50, 52 of the blade. The coating may comprise a material having a higher hardness than the tip portion, for example the coating may comprise Titanium Nitride and/or Chromium Nitride. The coating may comprise a thin-film coating having a thickness of between 2 and 10 microns. The coating may include hard and/or abrasive particles such as Cubic Boron Nitride (CBN), Zirconia (e.g. Zirconium Dioxide) or similar.

In addition to the ridge line 62, the tip portion 48' may further comprise a plurality of cutting edges provided on at least a portion of the tip surface, e.g. on the first and/or second surfaces 64, 66. The cutting edges may be angled or parallel with respect to the ridge line 62. The plurality of cutting edges may be arranged in a regular or irregular fashion on the tip surface. An irregular arrangement of the cutting edges may be random or pseudorandom, e.g. such that the arrangement may be repeatable across a plurality of blade tips (by virtue of a repeatable manufacturing process). In either case, the plurality of cutting edges may provide a more efficient cutting surface and may thus minimise the heat generated and transferred into the blade tip. The size and shape of cutting nodules formed by the cutting edges may vary as can the directions and shape of the cutting edges.

Figure 5A:
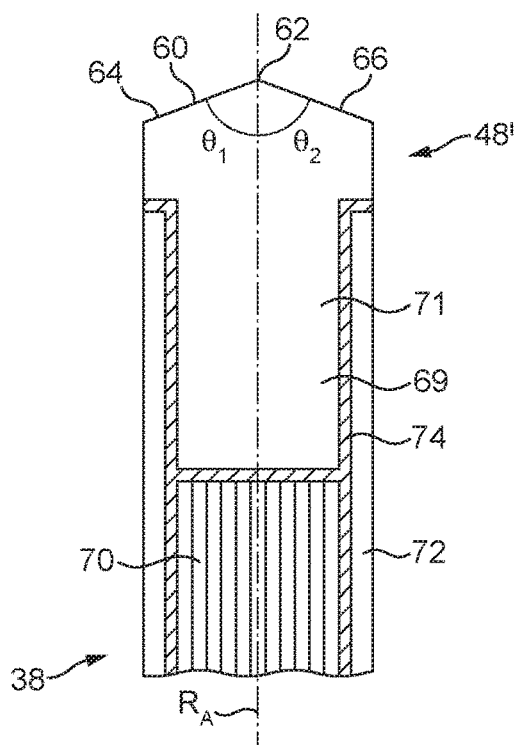
FIGS. 5a and 5b are cross-sectional views in a radial plane of the blade tip shown in FIG. 4 with FIG. 5b showing the blade tip interacting with the casing.
Figure 5B:
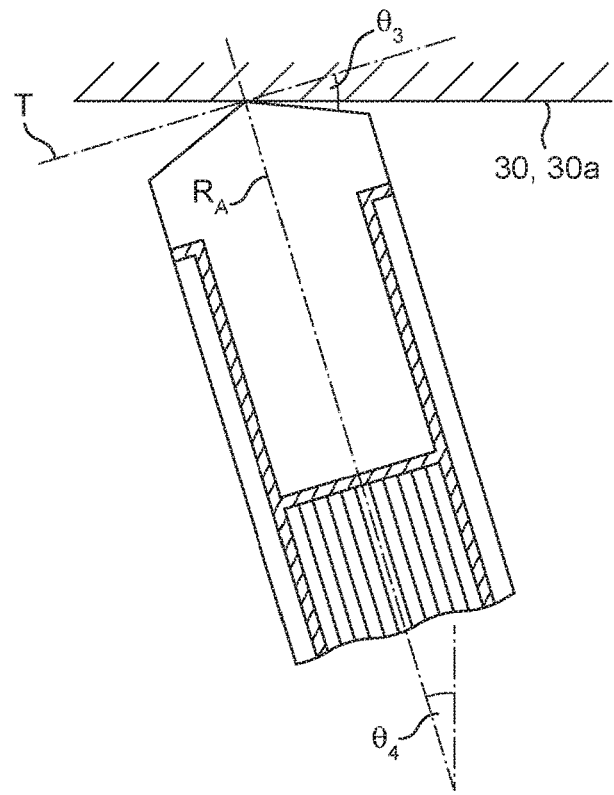

Referring to FIGS. 5a and 5b, it is shown that the first surface 64, second surface 66 and ridge line 62 substantially define a roof-top shaped cross-section. At the interface between the first and second surfaces, the first surface is angled at a first angle $\theta^1$ with respect to the radial axis RA of the blade and the second surface is angled at a second angle $\theta^2$ with respect to the radial axis of the blade. As depicted, the first and second angles $\theta^1$, $\theta^2$ may be substantially the same, such that the roof top is substantially symmetrical in cross-section, however, in an alternative arrangement they may be different.

The roof top may be relatively shallow, e.g. relative to a sharp edge. The total angle defined by the sum of the first and second angles $\theta^1$, $\theta^2$ (e.g. the angle between the first and second surfaces) may be between 90 and 180 degrees and, in a particular range of examples, the total angle may be between 110 and 160 degrees. The total angle defined by the sum of the first and second angles $\theta^1$, $\theta^2$ may be approximately 135 degrees.

The roof-top arrangement of the present disclosure may be applied to a solid metal blade or a composite blade, such as a carbon composite. As depicted in FIG. 5, the tip portion 48', which may be made from a metal, such as titanium, is provided with a base portion 69 for bonding or otherwise joining to the aerofoil portion 38 of the blade 26. The aerofoil portion may be provided with a recess 71 configured to receive the base portion 69. In the case of a composite blade, the aerofoil portion may comprise an inner portion of carbon composite material 70 and an outer protective layer 72, which may be metallic. In either case, an adhesive 74 may bond the base portion 69 in position. Other forms of securing the base portion 69 to the remainder of the blade 26 will present themselves to those skilled in the art.

As depicted in FIG. 5b, the ridge line 62 is configured to cut, e.g. abrade, into the casing structure 30 during an interaction between the blade 26 and casing structure, for example following a bird strike, blade off event, running in of the engine or any other such event that causes the blade to interact with the casing. The ridge line 62 may therefore act as a cutting edge.

So that the ridge line 62 is presented to the casing 30 as a cutting edge, an angle $\theta^3$ between one of the first and second surfaces 64, 66 and the tangent T to the radial axis of the blade may be greater than or equal to a maximum anticipated lean angle $\theta^4$ of the blade relative to the radial axis. The maximum lean angle of the blade may occur outside a normal mode of operation for the blade, e.g. following a bird strike, blade off event or other such event.

It will be appreciated that the roof top shape of the present disclosure advantageously maximises the amount of material between the ridge line 62 cutting edge and the adhesive 74 that holds the tip in situ. The heating of the adhesive is thus kept to a minimum. By contrast, a conventional right angle cutting edge between the pressure/suction surfaces and the tip surface will inevitably be physically closer to the adhesive and the adhesive will be exposed to higher temperatures.

The tip arrangement of the present disclosure may also be used in combination with a soft or abradable casing liner material. Abrasive coatings or cutting edges are conventionally used to abrade hard surfaces, however, by abrading a soft surface the cutting temperatures may be advantageously reduced.

Furthermore, unlike a sharp conventional right angle edge, the roof top apex of the present disclosure, provides a more rounded and therefore more secure edge for the coating 68 to adhere to, thereby enhancing the robustness and longevity of the coating. The roof top cross-sectional shape of the present disclosure reduces the tangential forces experienced by the tip and blade during an interaction with the casing. This is particularly the case for the rapid incursion of the tip into the casing liner following a bird strike. During such a rapid incursion, the blade may lean back away from the direction of travel, as depicted in FIG. 5b, and in doing so progressively expose more and more of the abrasive coating to the casing liner. The frictional forces (and thus the heat generated) will be reduced as more of the casing liner is cut or abraded away. The blade's chance of surviving such events is therefore improved.

In addition, the roof top shape is a more structurally efficient shape to withstand the significant radial forces exerted in the tip region during an incursion of the tip into the soft liner as described above. Again, the blade's chance of surviving such events is therefore improved.

In view of the above, it will be appreciated that the roof top shape, e.g. the location of the ridge line and/or the values of the first and second angles $\theta^1$, $\theta^2$, may be optimised to minimise the heat transfer to the adhesive/aerofoil portion and/or maximise the strength of the ridge line cutting edge.

The present disclosure enables a composite fan blade to survive the temperatures and cutting forces associated with the tip cutting into the fan casing liner. The present disclosure may advantageously combine what might otherwise be an inefficient cutting shape (e.g. a relatively shallow roof top) with an efficient cutting media such as an abrasive coating. This combination provides an optimal temperature and structural strength capability.

Figure 6A:
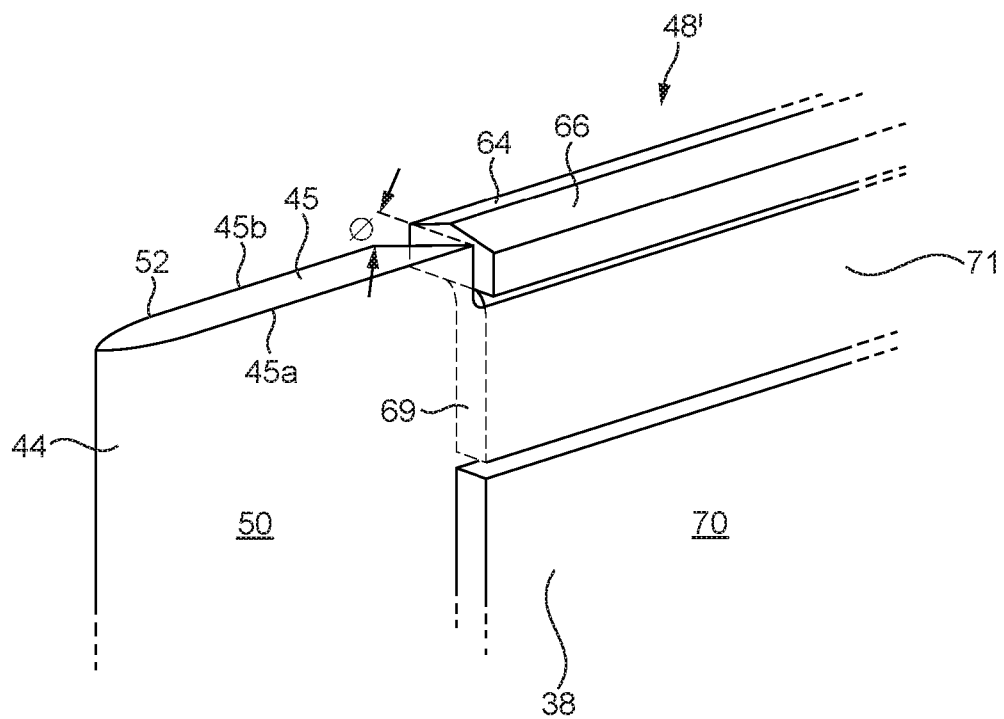
FIGS. 6a and 6b are perspective views of the leading and trailing edges of the blade tip according to a further example of the present disclosure.
Figure 6B:
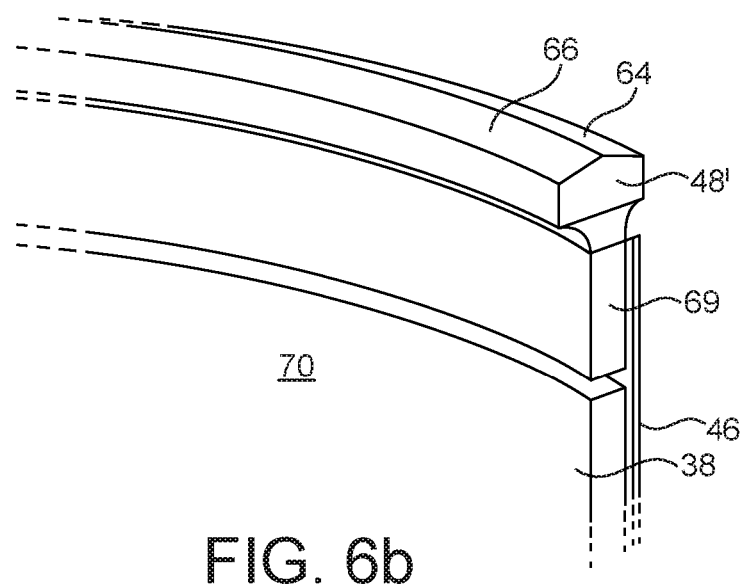

Referring now to FIG. 6, FIGS. 6a and 6b show perspective views of the leading and trailing edges of the blade 26 respectively. As is depicted in FIG. 6a, the tip portion 48' of the present disclosure may be set back from the leading edge 44 of the blade 26. In other words, the ridge line 62 may not extend from the leading edge 44 of the blade, but rather from a point beyond the leading edge. Accordingly, the tip surface 60 comprises a leading edge portion 45, which extends from the leading edge 44 to the start of the ridge line 62. In an alternative arrangement, however, the ridge line may extend substantially from the leading edge 44 of the blade. In the case of the tip portion not extending to the leading edge, the ridge line 62 may protrude above the leading edge portion 45. As a result, the tip portion 48' may interact with the casing 30 in preference to the leading edge portion 45.

The leading edge portion 45 may have a clearance angle $\phi$, for example such that a first tip edge 45a on the pressure side 50 of the leading edge portion 45 may have a greater radius from the centreline CL than a second tip edge 45b on the suction side 52 of the leading edge portion 45. As a result, in the event that the leading edge portion 45 does interact with the casing 30, the first tip edge 45a performs a cutting operation.

By contrast, as depicted in FIG. 6b, the tip portion 48', and hence ridge line 62, may extend substantially to the trailing edge 46 of the blade. However, in an alternative arrangement, the ridge line may be set back from the trailing edge in a manner similar to that for the leading edge.

FIG. 6 also depicts the recess 71, e.g. pocket, in the aerofoil portion 38, which is configured to receive the tip portion 48', for example the base portion 69 of the tip portion. The tip portion 48' may be substantially T-shaped in cross-section, with the base portion 69 forming a stem of the T-shape. The remainder of the T-shaped cross-section, upon which the first and second surfaces 64, 66 are provided, may substantially correspond in width to the aerofoil portion 38 such that the tip portion is substantially flush with the aerofoil portion.

With reference to FIGS. 7a, 7b and 7c, it will be appreciated that the tip portion 48' may be curved in one or more planes. FIG. 7a is a side view of the entire tip portion 48' and depicts that the tip portion may be curved in an axial plane. The curve in the axial plane may, for example, be due to the shape of the casing and the stagger of the blades 26. FIGS. 7b and 7c show perspective views of the tip portion 48' and depict that the tip portion may also be curved when viewed in a radial plane. The curvature in the radial plane may, for example, be due to the camber and stagger of the blades 26. As a result, it will be appreciated that the first and second surfaces 64, 66 may not be flat. FIGS. 7b and 7c also depict that a width of the tip portion may vary along the blade tip and correspondingly a width W of the first and/or second surfaces 64, 66 may also vary.

Turning now to FIG. 8, a range of possible cross-sectional shapes for the tip portion of the present disclosure are shown. For the sake of comparison, FIG. 8a shows the aforementioned arrangement with a single ridge line 62 and a sustainably symmetrical cross-section.

With reference to FIGS. 8b, 8c, 8d and 8g, the tip portion may further comprise a further ridge line 62b extending along at least a portion of the tip surface 60. The further ridge line 62b may be defined by the intersection of third and fourth surfaces 64b, 66b provided on the tip surface. The further ridge line 62b may be substantially parallel to the ridge line 62. The cross-sectional shape may be substantially symmetrical about the radial axis (FIGS. 8b and 8g) or asymmetrical (FIGS. 8c and 8d) about the radial axis.

Figure 8A:
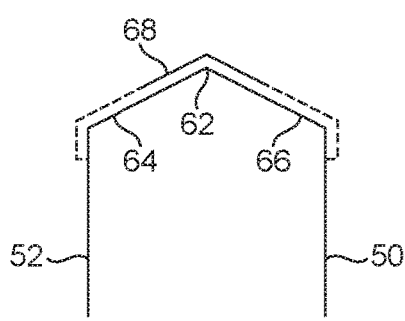
FIGS. 8a-8h are cross-sectional views in a radial plane of alternative blade tip profiles that may be applied to the tip in accordance with the present disclosure.
Figure 8B:
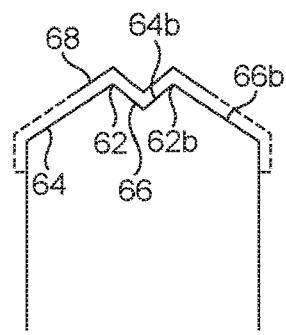
Figure 8C:
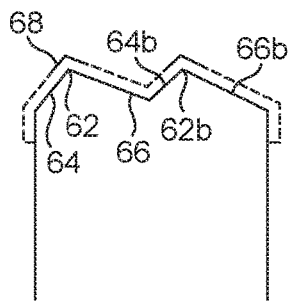
Figure 8D:
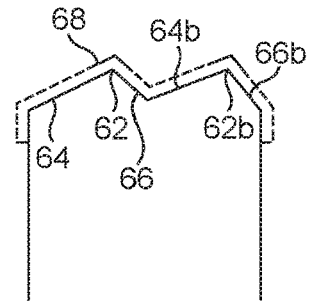
Figure 8E:
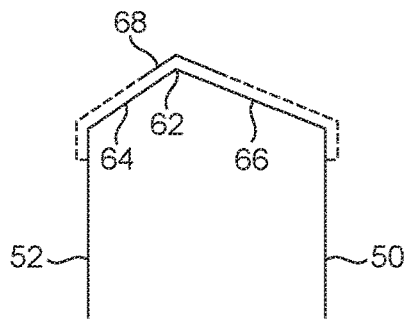
Figure 8F:
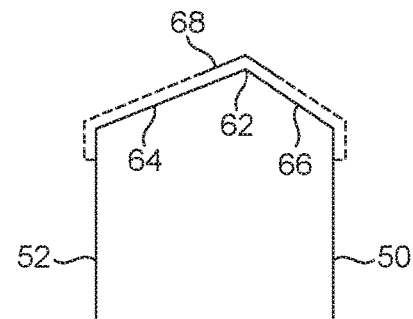

As best depicted in FIGS. 8e and 8f, the ridge line 62 may be substantially parallel to, e.g. offset from, the camber line of the blade at the tip surface. Accordingly, the first and second angles $\theta^1$, $\theta^2$ may be different. The ridge line 62 may be offset towards the suction surface 52 (as depicted in FIG. 8e) or towards the pressure surface 50 (as depicted in FIG. 8f).

Figure 8G:
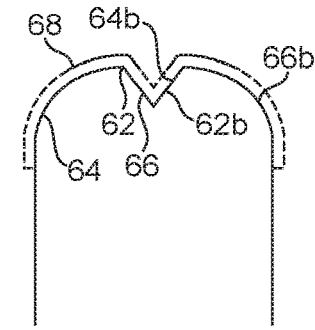
Figure 8H:
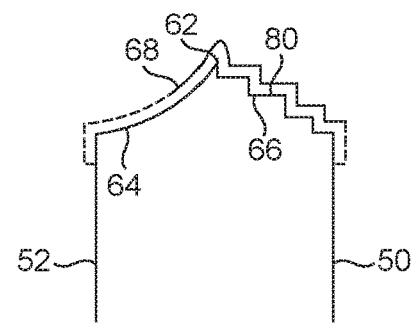

Referring to FIGS. 8g and 8h, any of the surfaces forming the tip surface (e.g. first, second, third and/or fourth surfaces) may be convex or concave. Although not depicted, one of the first and second surfaces may be convex and the other may be concave.

Referring to FIG. 8h, one or both of the first and second surfaces 64, 66 may comprise one or more cutting edges 80 provided on the surface thereon. For example, the surface may be terraced. As depicted, the cutting edges 80 may be provided on the second surface 66, e.g. the surface closest to the pressure surface 50 of the aerofoil portion. With such an arrangement, the cutting edges may be presented to the casing structure when the blade leans (as depicted in FIG. 5b), e.g. following a bird strike, and as a result a more effective cutting action may be provided.

As mentioned above, a coating 68 may be applied to the ridge line(s) 62, 62b. The dashed lines in FIG. 8 indicate that the coating may optionally extend over the remainder of the tip surface 60. The coating 68 may also extend beyond the tip surface along a portion of the pressure and/or suction surfaces 50, 52.

It will be appreciated that any combination of the features described with reference to FIG. 8 may be applied to the tip surface of the present disclosure.

The blade 26 as described above may be a compressor blade, such as a fan blade 26, or may, in certain circumstances, be a turbine blade (not shown). The blade 26 may be part of an engine 10 as discussed with reference to FIG. 1 above and the present disclosure extends to such an engine with such a blade 26. The blade 26 as described above may also be applied to ducted fans, e.g., future aircraft engine architectures, hovercraft propelling fans, ducted helicopter rear rotors, air-conditioning fans, wind tunnel propulsors, marine propulsors and marine power generators or any other ducted fan. The blade 26 of the present disclosure may also be applied to disc or drum seals and to labyrinth seal fins.

It will be appreciated that individual items described above may be used on their own or in combination with other items shown in the drawings or described in the description and that items mentioned in the same sentence as each other or the same drawing as each other need not be used in combination with each other. In addition the expression "means" may be replaced by actuator or system or device as may be desirable. In addition, any reference to "comprising" or "consisting" is not intended to be limiting any way whatsoever and the reader should interpret the description and claims accordingly.

INDEX OF REFERENCE NUMERALS

CL centre line
R direction of rotation
RA radial axis
T direction of a tangent
$\theta^1$ first angle
$\theta^2$ second angle
$\theta^3$ angle between one of the first and second surfaces
$\theta^4$ maximum anticipated lean angle
φ clearance angle
W width of first or second surface
10 turbofan gas turbine engine
12 inlet
14 fan section
16 compressor section
18 combustion section
20 turbine section
22 exhaust
24 fan rotor
26 fan blade
28 bypass duct
30 fan casing
30a abradable lining
34 core engine casing
32 fan outlet guide vanes
36 root portion
38 aerofoil portion
40 slot
42 disk
43 nose cone
44 leading edge
45 leading edge portion
45a first tip edge
45b second tip edge
46 trailing edge
48 tip 48' tip portion
50 concave pressure surface
52 convex suction surface
60 tip surface
62 ridge line
62b further ridge line
64 first surface
64b third surface
66 second surface
66b fourth surface
68 coating
69 base portion
70 carbon composite material
71 recess
72 outer protective layer
74 adhesive
80 cutting edges

I claim:

1. An aerofoil structure for a gas turbine engine, the aerofoil structure comprising:
    a carbon composite aerofoil portion; and
    a tip portion, the tip portion comprising:
        a tip surface configured to face a corresponding casing structure, the tip portion further comprising a ridge line cutting edge extending along at least a portion of the tip surface, wherein the tip surface comprises a first surface and a second surface provided on a first side and a second side, respectively of the ridge line cutting edge,
        wherein, at the ridge line cutting edge, the first surface is angled at a first angle with respect to a radial axis of the aerofoil structure and the second surface is angled at a second angle with respect to the radial axis of the aerofoil structure so that the ridge line cutting edge is defined by an intersection of the first and second surfaces,
        wherein the ridge line cutting edge and the first and second surfaces define a roof-top shaped cross-section,
        the roof-top shaped cross-section having a total angle at the ridge line cutting edge which is the sum of the first angle and the second angle, and
        wherein the ridge line cutting edge follows a camber line of the aerofoil structure at the tip surface and is configured to cut into the casing structure during an interaction between the aerofoil structure and casing structure.

2. An aerofoil structure as claimed in claim 1, wherein the ridge line cutting edge is parallel to the camber line of the aerofoil structure at the tip surface.

3. An aerofoil structure as claimed in claim 1, wherein the first and second angles are equal.

4. An aerofoil structure as claimed in claim 1, wherein the first angle is different from the second angle.

5. An aerofoil structure as claimed in claim 1, wherein one or both of the first and second surfaces are convex.

6. An aerofoil structure as claimed in claim 1, wherein one or both of the first and second surfaces are concave.

7. An aerofoil structure as claimed in claim 1, wherein one or both of the first and second surfaces comprise one or more cutting edges provided on a surface thereon.

8. An aerofoil structure as claimed in claim 1, wherein an angle between one of the first and second surfaces and a tangent to a radial axis of the aerofoil structure is greater than or equal to a maximum anticipated lean angle of the aerofoil structure relative to the radial axis occurring outside a normal mode of operation for the aerofoil structure.

9. An aerofoil structure as claimed in claim 1, wherein the tip portion further comprises a further ridge line extending along at least a portion of the tip surface.

10. An aerofoil structure as claimed in claim 1, wherein the aerofoil structure further comprises a coating provided over the ridge line cutting edge.

11. An aerofoil structure as claimed in claim 10, wherein the coating extends over the tip surface.

12. An aerofoil structure as claimed in claim 11, wherein the coating extends over and beyond the tip surface.

13. An aerofoil structure as claimed in claim 10, wherein the coating comprises embedded abrasive particles selected from the group consisting of: Cubic Boron Nitride (CBN), Zirconia, and combinations thereof.

14. An aerofoil structure as claimed in claim 1, wherein the aerofoil structure comprises a metallic tip portion.

15. The aerofoil structure as claimed in claim 1, wherein the aerofoil structure is a first aerofoil structure of a gas turbine engine.

16. A compressor fan blade or a turbine blade of a gas turbine engine comprising:
    an aerofoil structure having:
        a carbon composite aerofoil portion; and
        a tip portion, the tip portion comprising:
            a tip surface configured to face a corresponding casing structure, the tip portion further comprising a ridge line cutting edge extending along at least a portion of the tip surface, wherein the tip surface comprises a first surface and a second surface provided on a first side and a second side respectively, of the ridge line cutting edge,
            wherein, at the ridge line cutting edge, the first surface is angled at a first angle with respect to a radial axis of the aerofoil structure and the second surface is angled at a second angle with respect to the radial axis of the aerofoil structure so that the ridge line cutting edge is defined by an intersection of the first and second surfaces,
            wherein the ridge line cutting edge and the first and second surfaces define a roof-top shaped cross-section,
            the roof-top shaped cross-section having a total angle at the ridge line cutting edge, which is the sum of the first angle and the second angle; and
            wherein the ridge line cutting edge follows a camber line of the aerofoil structure at the tip surface.

17. A fan blade for a gas turbine engine, comprising:
an aerofoil structure comprising a carbon composite aerofoil portion; and
a tip portion comprising a tip surface arranged to face a corresponding casing structure, the tip surface comprising:
    a first tip surface and a second tip surface, both being angled with respect to one another at an intersection between them to form a ridge line cutting edge extending along at least a portion of the tip surface,
    wherein the ridge line cutting edge and the first and second tip surfaces define a roof-top shaped cross-section,
    wherein, at the ridge line cutting edge, the first tip surface is angled at a first angle with respect to a radial axis of the aerofoil structure and the second tip surface is angled at a second angle with respect to the radial axis of the aerofoil structure, the roof-top shaped cross-section having a total angle which is the sum of the first angle and the second angle; and wherein the ridge line cutting edge follows a camber line of the aerofoil structure at the tip surface and is configured to cut into the casing structure during an interaction between the fan blade and the casing structure.

* * * * *